US009223740B2

(12) United States Patent
Yu

(10) Patent No.: US 9,223,740 B2
(45) Date of Patent: *Dec. 29, 2015

(54) DETECTION METHOD AND APPARATUS FOR HOT-SWAPPING OF SD CARD

(71) Applicant: MStar Semiconductor, Inc., Hsinchu County (TW)

(72) Inventor: De-Jun Yu, Shanghai (CN)

(73) Assignee: MSTAR SEMICONDUCTOR, INC., Hsinchu County ( * ) Notice: Subject to any disclaimer, the term of this patent is extended or adjusted under 35 U.S.C. 154(b) by 273 days.

This patent is subject to a terminal disclaimer.

(21) Appl. No.: 13/743,436

(22) Filed: Jan. 17, 2013

(65) Prior Publication Data
US 2013/0185471 A1  Jul. 18, 2013

(30) Foreign Application Priority Data

Jan. 18, 2012 (CN) .......................... 2012 1 0015931

(51) Int. Cl.
*G06F 13/40* (2006.01)
(52) U.S. Cl.
CPC .................. *G06F 13/4081* (2013.01)
(58) Field of Classification Search
CPC . G06F 9/4411; G06F 9/4413; G06F 13/4063; G06F 13/4068; G06F 13/4081; H05K 7/10
USPC ................ 710/15, 17, 19, 301–304, 109, 220
See application file for complete search history.

(56) References Cited

U.S. PATENT DOCUMENTS

| 2002/0152280 | A1* | 10/2002 | Winkeler et al. | 709/217 |
| 2002/0169913 | A1* | 11/2002 | Heizer et al. | 710/302 |
| 2004/0078514 | A1* | 4/2004 | Kung et al. | 711/105 |
| 2005/0132104 | A1* | 6/2005 | Brown | 710/36 |
| 2007/0293184 | A1* | 12/2007 | Nevalainen et al. | 455/403 |
| 2008/0071963 | A1* | 3/2008 | Chow et al. | 710/313 |
| 2013/0185470 | A1* | 7/2013 | Yu | 710/302 |

FOREIGN PATENT DOCUMENTS

CN    101986237 A  *  3/2011

OTHER PUBLICATIONS

"Linux Programmer's Manual". Entry 'hotplug'. Online Aug. 2002. Retrieved from Internet Dec. 3, 2014. <http://linuxcommand.org/man_pages/hotplug8.html>.*
State Intellectual Property Office of the People's Republic of China. "Office Action". Feb. 11, 2014.*
Taiwan Intellectual Property Office. "Office Action". Jun. 6, 2014.*

* cited by examiner

*Primary Examiner* — Thomas J Cleary
(74) *Attorney, Agent, or Firm* — WPAT, PC; Justin King

(57) ABSTRACT

A detection method for detecting a hot-swapping status of a Secure Digital (SD) card is provided. The detection method includes steps of: transmitting an inquiry command to the SD card at a predetermined frequency when an application requiring the hot-swapping status of the SD card is activated; receiving a current command return message replied in response to the inquiry command, wherein the current command return message includes information indicative of a presence or information indicative of an absence of the SD card; determining the hot-swapping status according to a previous command return message and the current command return message; and replying the determined hot-swapping status to the application.

10 Claims, 2 Drawing Sheets

DETECTION METHOD AND APPARATUS FOR HOT-SWAPPING OF SD CARD

This application claims the benefit of People's Republic of China application Serial No. 201210015931.X, filed Jan. 18, 2012, the subject matter of which is incorporated herein by reference.

BACKGROUND OF THE INVENTION

1. Field of the Invention

The invention relates in general to a computer field, and more particularly to a detection method and apparatus for hot-swapping of a Secure Digital (SD) card.

2. Description of the Related Art

A Secure Digital (SD) memory card (to be referred to as an SD card) is commonly converted to be operable as a Universal Serial Bus (USB) device through an SD card reader. When an SD card is removed from an SD card reader that is still plugged to a USB interface of a system, a Linux operating system cannot detect such hot-swapping event of the SD card.

In practice, when an SD card is removed from an SD card reader by a user, upper-layer applications of an operating system are unaware of the removal of the SD card. The upper-layer systems, stilling considering the SD card readable and writable, may continue to access the SD card. However, read and write failures are caused as data cannot be read from or written to the non-existent SD card.

Therefore, application confusions are often resulted as hot-swapping events are not in real-time detected.

SUMMARY OF THE INVENTION

The invention is directed to a detection method and apparatus for hot-swapping of an SD card. The detection method and apparatus is capable of in real-time detecting hot-swapping of an SD card to provide an accurate status of the SD card to upper-layer applications.

According to an aspect of the disclosure, a detection method for detecting a hot-swapping status of an SD card is provided. The detection method includes steps of: transmitting an inquiry command to the SD card at a predetermined frequency when an application requiring the hot-swapping status is activated; receiving a current command return message replied in response to the inquiry command, wherein the current command return message includes information indicative of a presence of the SD card or information indicative of an absence of the SD card; determining the hot-swapping status according to a previous command return message stored at a local end and the current command return message; and replying the determined hot-swapping status to the application.

According to another aspect of the disclosure, a detection apparatus for detecting a hot-swapping status of an SD card is provided. The detection apparatus includes: a transmitting module, for transmitting an inquiry command to the SD card at a predetermined frequency when an application requiring the hot-swapping status is activated; a receiving module, for receiving a current command return message replied in response to the inquiry command; a determining module, coupled to the receiving module, for determining the hot-swapping status according to a previous command return message stored at a local end and the current command return message; and a status reply module, for replying the determined hot-swapping status to the application.

According to embodiments of the disclosure, the inquiry command is transmitted to the SD card at the predetermined frequency, the command return message replied in response to the inquiry command is received, and it is then determined whether the SD card is removed or plugged according to the command return message. Such approach is capable of detecting the hot-swapping status of the SD card in real-time to provide an accurate status of the SD card to upper-layer applications. Further, in the disclosure, a polling thread for detecting the hot-swapping of the SD card is disposed in a user mode, and thus application and operation flexibilities are further enhanced since modifications are made to only application-layer programs instead of to kernel-layer programs.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
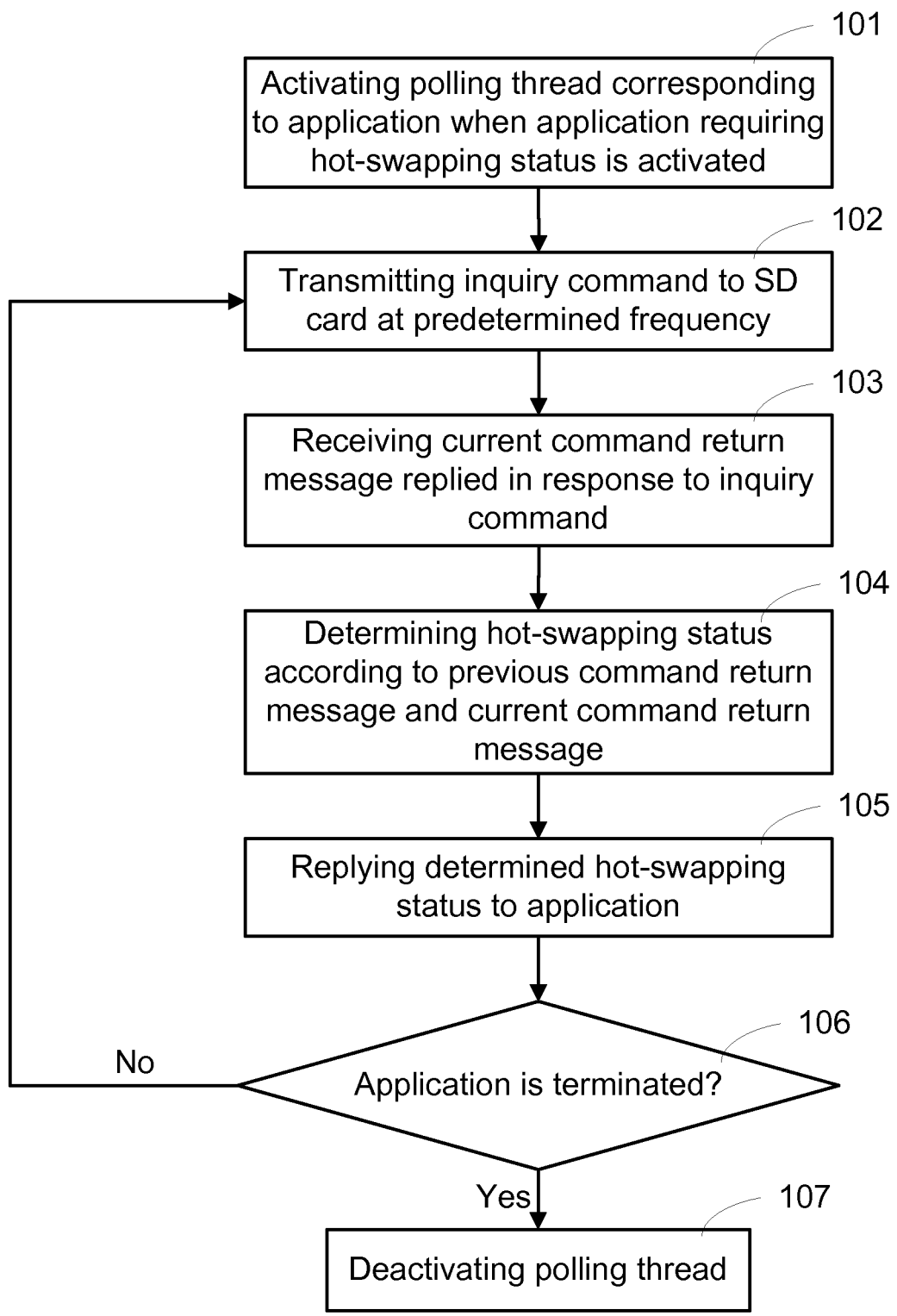
FIG. 1 is flowchart of a detection method for hot-swapping of an SD card according to an embodiment of the disclosure.

FIG. 1 shows a flowchart of a detection method for detecting hot-swapping of an SD card according to an embodiment of the disclosure. With reference to FIG. 1, the detection method for detecting hot-swapping of an SD card includes the following steps.

In step 101, when an application requiring a hot-swapping status of an SD card is activated, a polling thread for transmitting an inquiry command to the SD card at a predetermined frequency is activated. Taking a Linux operating system for example, the transmission of the inquiry command to the SD card can be implemented by activating a polling thread at an application end.

In step 102, the inquiry command is transmitted to the SD card at the predetermined frequency. For example, when transmitting a "TEST UNIT READY" command, a computer system interface reacts to the inquiry command in the presence of the SD card according to SD card communication protocols. That is, the computer system interface replies information indicative of the presence of the SD card. Else, the system receives information indicative of the absence of the SD card.

In step 103, a current command return message is received. The command return message is transmitted according to the inquiry command and the hot-swapping status of the SD card. For example, the command return message includes two types of information—information indicative of the presence of the SD card, and information indicative of the absence of the SD card. The command return message replied each time only includes one of the above two types of information. For example, a return value 1 represents the information indicative of the presence of the SD card, and a return value 0 represents the information indicative of the absence of the SD card.

In step 104, the hot-swapping status of the SD card is determined according to a previous command return message received at a local end and the current command return message. The determination in step 104 includes the following situations.

In a first situation, when the previous command return message is the information indicative of the presence of the SD card and the current command return message is the information indicative of the absence of the SD card, it is determined that the SD card is removed.

In a second situation, when the previous command return message is the information indicative of the absence of the SD card and the current command return message is the information indicative of the presence of the SD card, it is determined that the SD card is plugged.

In a third situation, when the previous command return message is the information indicative of the presence of the SD card and the current command return message is also the information indicative of the presence of the SD card, it is determined that the SD card is not removed.

In a fourth situation, when the previous command return message is the information indicative of the absence of the SD card and the current command return message is also the information indicative of the absence of the SD card, it is determined that the SD card is not plugged.

The previous command return message is then replaced by the current command return message for the use of a next determination process. In the last two situations, since the status of the SD card is unchanged, i.e., the previous command return message and the current command return message are the same, the replacement of the command return message is not necessary.

In step 105, the determined hot-swapping status of the SD card is replied to the application requiring the hot-swapping status of the SD card.

In step 106, it is determined whether the application requiring the hot-swapping status is terminated. When the application requiring the hot-swapping status is not terminated, step 102 is iterated. When the application requiring the hot-swapping status is terminated, step 107 is performed to deactivate the polling thread.

In this embodiment, the inquiry command is transmitted to the SD card at the predetermined card using the polling thread embedded to an application layer, the command return message replied in response to the inquiry command is received, and it is determined whether the SD card is removed or plugged according to the command return message. Such approach is capable of in real-time detecting the hot-swapping status of the SD card to provide an accurate status of the SD card to upper-layer applications.

Further, the polling thread can be utilized by multiple applications, that is, the message indicating whether the SD card is removed or plugged is provided to multiple applications by the polling thread.

When multiple applications of a same manufacturer require the hot-swapping status of the SD card, the multiple applications may share the determined hot-swapping status of the SD card. Thus, by activating one polling thread, the hot-swapping status of the SD card can be provided to the multiple applications to significantly reduce the resource consumption of the polling thread for the system.

Further, the polling thread in this process is disposed in a user mode. When detecting the hot-swapping status of the SD card using the polling thread, modifications are made to only application-layer programs instead of to kernel-layer programs so that application and operation flexibilities are enhanced.

Figure 2:
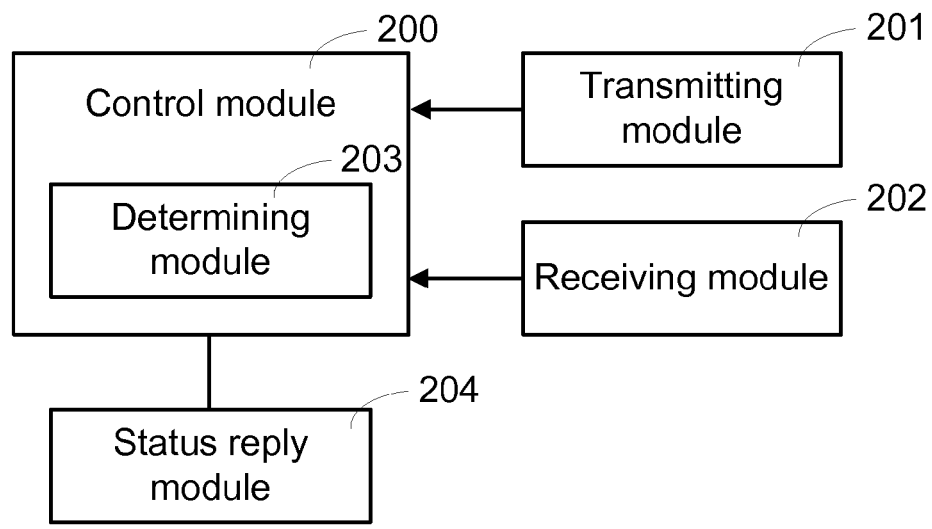
FIG. 2 is a block diagram of a detection apparatus for hot-swapping of an SD card according to an embodiment of the disclosure.

FIG. 2 shows a block diagram of a detection apparatus for hot-swapping of an SD card according to an embodiment of the disclosure. The detection apparatus for hot-swapping of an SD card according to the embodiment includes a control module 200, a status reply module 204, a transmitting module 201, and a receiving module 202. The control module 200 is coupled to the status reply module 204, the transmitting module 201 and the receiving module 201.

The transmitting module 201 transmits an inquiry command to the SD card at a predetermined frequency when an application requiring a hot-swapping status of the SD card is activated.

The receiving module 202 receives a current command return message replied in response to the inquiry command. The command return message includes information indicative of a presence of the SD card or information indicative of an absence of the SD card.

The control module 200 controls the transmitting module 201 to transmit the inquiry command to the SD card in a card reader at the predetermined frequency, and controls the receiving module 202 to receive the command return message replied in response to the inquiry command transmitted from the transmitting module 201.

The control module 200 further includes a determining module 203 coupled to the receiving module 202. The determining module 203 determines the hot-swapping status of the SD card according to a previous command return message stored at a local end and the current command return message.

When the previous command return message is the information indicative of the presence of the SD card and the current command return message is the information indicative of the absence of the SD card, the determining module 203 determines that the SD card is removed. When the previous command return message is the information indicative of the absence of the SD card and the current command return message is the information indicative of the presence of the SD card, the determining module 203 determines that the SD card is plugged.

When the previous command return message is the information indicative of the presence of the SD card and the current command return message is also the information indicative of the presence of the SD card, the determining module 203 determines that the SD card is not removed. When the previous command return message is the information indicative of the absence of the SD card and the current command return message is also the information indicative of the absence of the SD card, the determining module 203 determines that the SD card is not plugged.

The status reply module 204 is coupled to the determining module 203, and replies the determined hot-swapping status of the SD card to the application requiring the hot-swapping status of the SD card.

Figure 3:
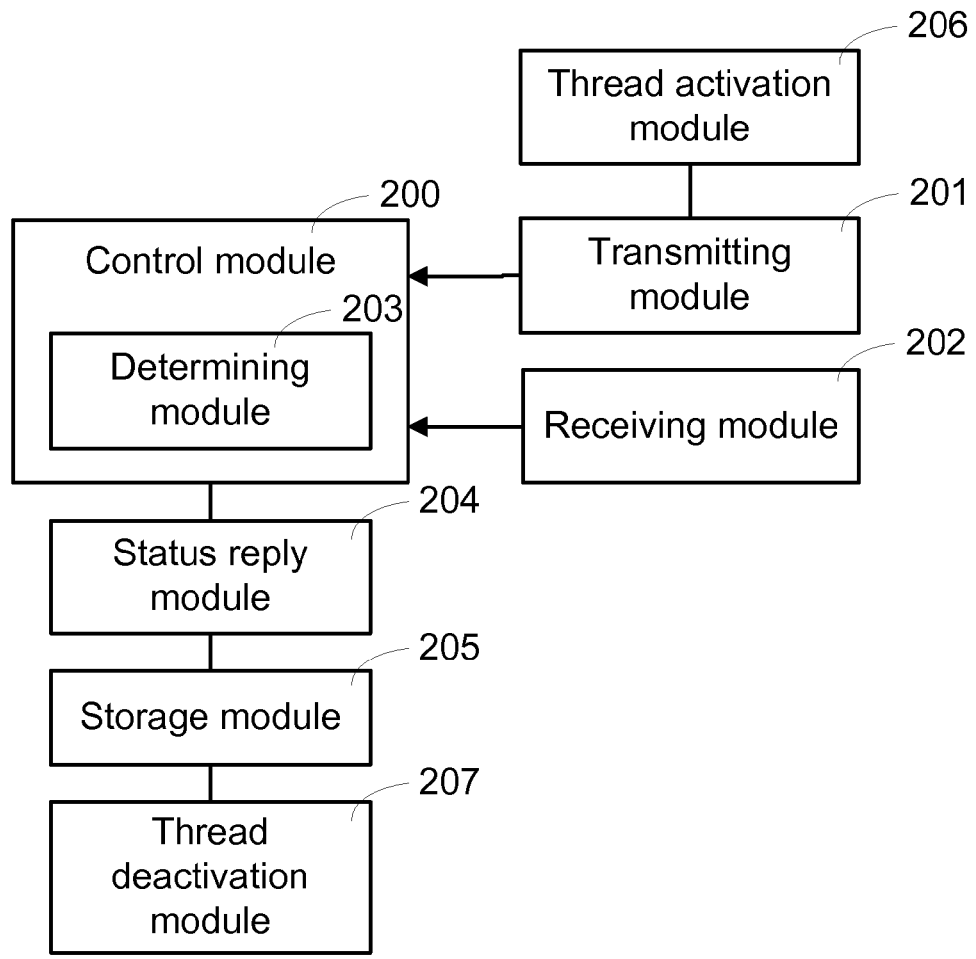
FIG. 3 is a block diagram of a detection apparatus for hot-swapping of an SD card according to another embodiment of the disclosure.

FIG. 3 shows a schematic diagram of a detection apparatus for hot-swapping of an SD card according to another embodiment of the disclosure. In addition to the modules in FIG. 2, the detection apparatus according to this embodiment further includes a thread activation module 206, a storage module 205, and a threshold deactivation module 207.

The storage module 205, coupled to the status reply module 204, replaces a previous command return message by a current command return message for the use of a next determination process when the current command return message and the previous command return message are different.

When an application requiring the hot-swapping status of the SD card is activated, the thread activation module 206 activates a polling thread to repetitively transmit an inquiry command to the SD card at a predetermined frequency. The polling thread corresponds to the application.

Taking a Linux operation system for example, assume that a polling thread is activated at an application end. The polling thread repetitively transmits the inquiry command to the SD card at the predetermined frequency. For example, when a "TEST UNIT READY" command is transmitted, a computer system interface reacts to the inquiry command in the presence of the SD card according to SD card communication protocols. That is, the computer system interface replies information indicative of the presence of the SD card. Else, the system receives information indicative of the absence of the SD card.

When an application requiring the hot-swapping status of the SD card is terminated, the thread deactivation module 207 deactivates the polling thread corresponding to the application.

Further, the thread activation module 206 activates a polling thread for repetitively transmitting the inquiry command to the SD card at the predetermined frequency when the application requiring the hot-swapping status of the SD card is activated. The polling thread may be utilized by multiple applications; that is, the message indicating whether the SD card is removed or plugged is provided to multiple applications by the polling thread.

Further, the thread deactivation module 207 deactivates the polling thread when all the applications requiring the hot-swapping status of the SD card are terminated.

Further, when the previous command return message is the information indicative of the presence of the SD card and the current command return message is also the information indicative of the presence of the SD card, the determining module 203 determines that the SD card is not removed. When the previous command return message is the information indicative of the absence of the SD card and the current command return message is also the information indicative of the absence of the SD card, the determining module 203 determines that the SD card is not plugged.

In this embodiment, the inquiry command is transmitted to the SD card at the predetermined card using the polling thread embedded to an application layer, the command return message replied in response to the inquiry command is received, and it is determined whether the SD card is removed or plugged according to the command return message. Such approach is capable of detecting a hot-swapping status of the SD card in real-time to provide an accurate status of the SD card to upper-layer applications.

Further, when multiple applications provided by a same manufacturer require the hot-swapping status of the SD card, the multiple applications may share the determined hot-swapping status of the SD card. Thus, by activating one polling thread, the hot-swapping status of the SD card can be provided to the multiple applications to significantly reduce the resource consumption of the polling thread for the system.

Moreover, by detecting the hot-swapping status of the SD card using the polling thread, modifications are made to only application-layer programs instead of to kernel-layer programs so that application and operation flexibilities are enhanced.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for detecting a hot-swapping status of a Secure Digital (SD) card in a linux operating system, comprising:
   activating a polling thread at an application end corresponding to a user-interacting application when the user-interacting application is activated, wherein the user-interacting application is running in a user mode and requiring the hot-swapping status, wherein the polling thread for detecting the hot-swapping status of the SD card is disposed in the user mode;
   transmitting an inquiry command to the SD card at a predetermined frequency;
   receiving a current command return message replied in response to the inquiry command, wherein the current command return message comprises information indicating whether the SD card is present;
   determining the hot-swapping status according to a comparison of a previous command return message and the current command return message;
   replying the hot-swapping status to the user-interacting application;
   deactivating the polling thread when the user-interacting application is terminated.

2. The method according to claim 1, wherein the step of determining the hot-swapping status according to the previous command return message and the current command return message comprises:
   when the previous command return message is information indicative of the presence of the SD card and the current command return message is information indicative of the absence of the SD card, determining that the SD card is removed; and
   when the previous command return message is the information indicative of the absence of the SD card and the current command return message is the information indicative of the presence of the SD card, determining that the SD card is plugged.

3. The detection method according to claim 1, further comprising:
   when a plurality of applications provided by a same manufacturer require the hot-swapping status, sharing the hot-swapping status among the applications.

4. The detection method according to claim 1, wherein the step of determining the hot-swapping status according to the previous command return message and the current command return message comprises:
   when the previous command return message and the current command return message are both information indicative of the presence of the SD card, determining that the SD card is not removed; and
   when the previous command return message and the current command return message are both information indicative of the absence of the SD card, determining that the SD card is not plugged.

5. The detection method according to claim 1, further comprising:
   replacing the previous command return message by the current command return message for use of a next determination process.

6. An apparatus for detecting a hot-swapping status of an SD card in a linux operating system, comprising:
   a thread activation module, for activating a polling thread at an application end corresponding to a user-interacting application when the user-interacting application is activated, wherein the user-interacting application is running in a user mode and requiring the hot-swapping status, wherein the polling thread for detecting the hot-swapping status of the SD card is disposed in the user mode;

a transmitting module, for transmitting an inquiry command to the SD card at a predetermined frequency;

a receiving module, for receiving a current command return message replied in response to the inquiry command;

a determining module, coupled to the receiving module, for determining the hot-swapping status according to a comparison of a previous command return message and the current command return message;

a status reply module, coupled to the determining module, for replying the hot-swapping status to the user-interacting application; and a thread deactivation module, for deactivating the polling thread when the user-interacting application is terminated.

7. The detection apparatus according to claim 6, wherein when the previous command return message is information indicative of a presence of the SD card and the current command return message is information indicative of an absence of the SD card, the determining module determines that the SD card is removed; when the previous command return message is the information indicative of the absence of the SD card and the current command return message is the information indicative of the presence of the SD card, the determining module determines that the SD card is plugged.

8. The detection apparatus according to claim 6, wherein when a plurality of applications provided by a same manufacturer require the hot-swapping status, the hot-swapping status is shared among the applications via the status reply module.

9. The detection apparatus according to claim 6, wherein when the previous command return message and the current command return message are both information indicative of the presence of the SD card, the determining module determines that the SD card is not removed; when the previous command return message and the current command return message are both information indicative of the absence of the SD card, the determining module determines that the SD card is not plugged.

10. The detection apparatus according to claim 6, further comprising:

a storage module, coupled to the status reply module, for replacing the previous command return message by the current command return message for use of a next determination process.

* * * * *